United States Patent [19]

Kim

[11] Patent Number: 5,285,770
[45] Date of Patent: Feb. 15, 1994

[54] CHARCOAL STARTER APPARATUS FOR CONVENTIONAL HIBACHI-TYPE GRILL

[76] Inventor: Stanley Kim, 714 75 Ave., Honolulu, Hi. 96816

[21] Appl. No.: 964,505

[22] Filed: Oct. 20, 1992

[51] Int. Cl.$^5$ ............................................. F24B 3/00
[52] U.S. Cl. ................................. 126/25 B; 126/9 B; 126/163 R
[58] Field of Search .................... 126/25 B, 9 R, 9 B, 126/25 R, 163 R, 163 A

[56] References Cited

U.S. PATENT DOCUMENTS

| | | | |
|---|---|---|---|
| 280,245 | 0/1883 | Schrack . | |
| 3,046,969 | 0/1962 | Davis | 126/9 |
| 3,192,913 | 7/1965 | Ridgway | 126/25 B |
| 3,307,506 | 3/1967 | Rose | 126/25 B |
| 3,538,905 | 11/1970 | Reichenbach | 126/25 B |
| 3,915,144 | 0/1975 | Tomita | 126/9 |
| 4,413,609 | 11/1983 | Tisdale | 126/25 R |
| 5,074,279 | 12/1991 | Sainsbury | 126/25 B |

OTHER PUBLICATIONS

Fabrication Booklet #1.
System Operation Booklet #2.

*Primary Examiner*—Carl D. Price
*Attorney, Agent, or Firm*—Martin E. Hsia

[57] ABSTRACT

A charcoal starter apparatus for use in combination with a conventional hibachi. A rectangular housing rests on the top perimeter of the hibachi, and is clamped to the underside top edge of the hibachi. The sidewalls of the housing have passageways for air supply ducts, with the outlets of the ducts resting in removable troughs in the interior base of the hibachi. The outlet ends of the ducts and deflectors attached to the troughs support the grates of the hibachi. A removable, truncated, pyramidally shaped cover having a square exhaust inlet with a vertical collar supports a square exhaust stack, with an inverted U-shaped cap attached to the top of the stack.

8 Claims, 4 Drawing Sheets

CHARCOAL STARTER APPARATUS FOR CONVENTIONAL HIBACHI-TYPE GRILL

FIELD OF INVENTION

This invention relates to a conventional hibachi-type grill, and more specifically, to charcoal starter devices for use therewith.

BACKGROUND OF INVENTION

Cooking with charcoal has become a very popular pastime among family and friends. Several varieties of types and forms of grill are commercially available and known in the prior art. One such type of cooking charcoal grill that is commercially available is known as the hibachi.

Two common methods which are used to ignite charcoal briquettes in the shallow rectangular container of the hibachi, are electrically heated starter rods and charcoal briquettes pre-impregnated with charcoal lighter fluid.

Electrically heated starter rods require electrical energy to heat the rods. However, electric outlets or power sources are not always available at picnic grounds or beaches, and the ignition process to burn the briquettes is slow.

Charcoal briquettes, pre-impregnated with charcoal lighter fluid, produce flames which engulf the briquettes within the hibachi when ignited. The open top of the conventional hibachi allows flames and hot gases to escape freely. Therefore, the generated useful heat is not used sufficiently to burn briquettes quickly. The tiring task of fanning air to provide needed oxygen to expedite the burning of briquettes is history.

One such fuel ignitor device is U.S. Pat. No. 4,413,609 to Tisdale 1983. It comprises a perforated kindling enclosure which tapers outward from the top to the bottom. A hibachi-type grill which is open on the top and the bottom, with an included grate on the bottom that fits on top of the kindling enclosure is provided. The kindling enclosure employs paper to ignite charcoal. Because paper burns quickly, air flow is limited only when paper burns with no positive differential air pressure. The direction of heat from the burning paper is controlled by the direction of the wind because the kindling enclosure is perforated and the hibachi is used outdoors. The open top of the hibachi allows useful heat to escape freely, which does not contribute to burning the charcoal quickly.

SUMMARY

It is an object of this invention to provide a charcoal starter apparatus for conventional hibachi-type grills that constrains flames and heated air safely, enabling the maximum use of generated heat to ignite ordinary charcoal briquettes, while using starting agents such as charcoal lighter fluids, or if desired, quantities of wadded newspaper with wooden twigs.

It is another object of this invention to provide a continuous primary supply of air under the grates at all times, during the ignition process, to burn the briquettes.

It is another object of this invention to provide a portable and separable charcoal starter apparatus which is removable for compact storage.

Further objects and advantages of this present invention will become apparent from consideration of the drawings and the ensuing description.

BRIEF DESCRIPTION OF DRAWINGS

FIG. 18 view thereof;

DESCRIPTION OF THE PREFERRED EMBODIMENT

Referring to the parts which are numerically designated throughout the various drawings, it is to be appreciated or understood that parts and sub-parts are achieved from processes and skills used in the standard industry of sheetmetal.

Figure 1:
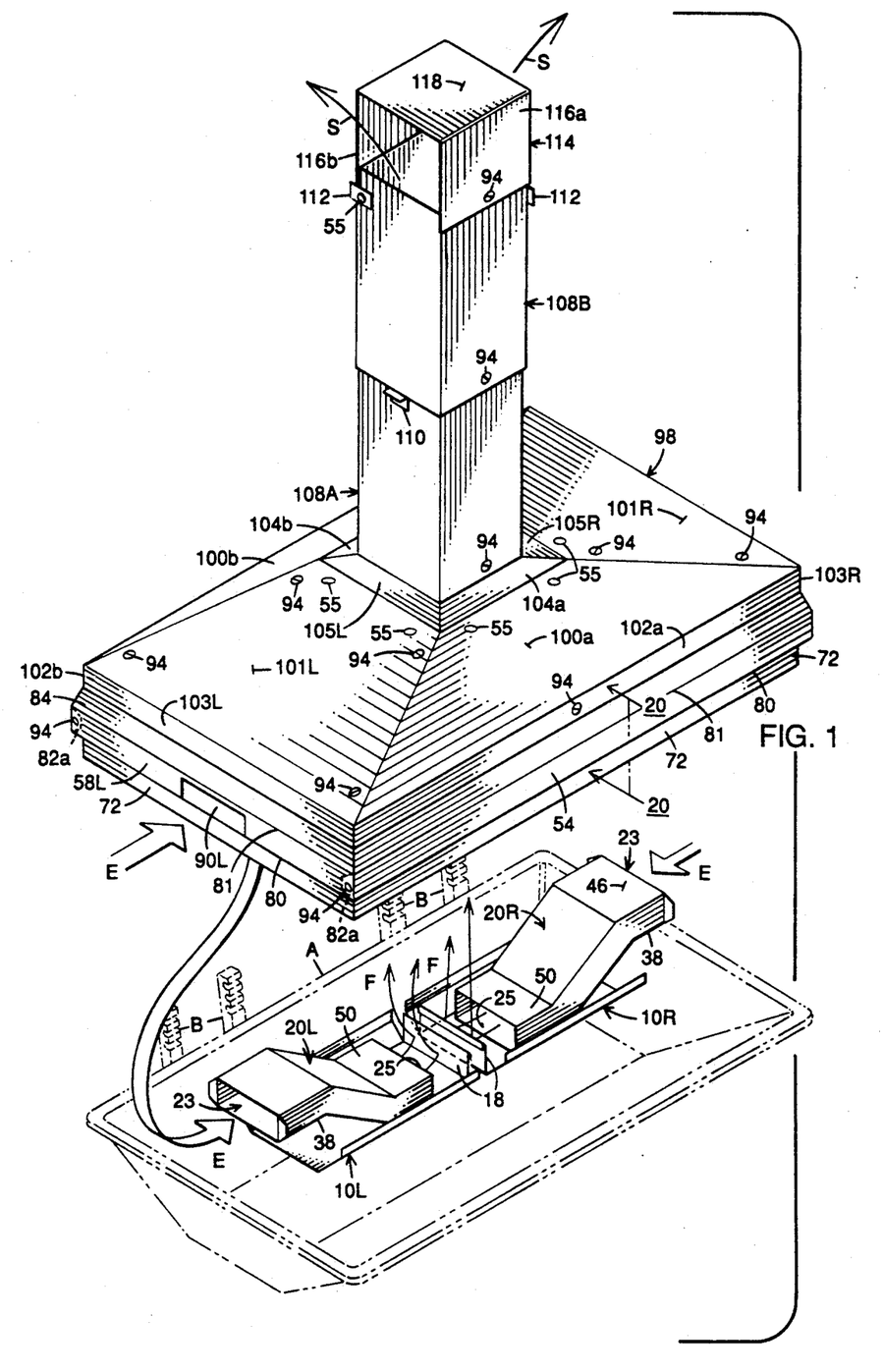
FIG. 1 is an exploded perspective view of the Charcoal Starter Apparatus for conventional hibachi-type grills.
Figure 17:
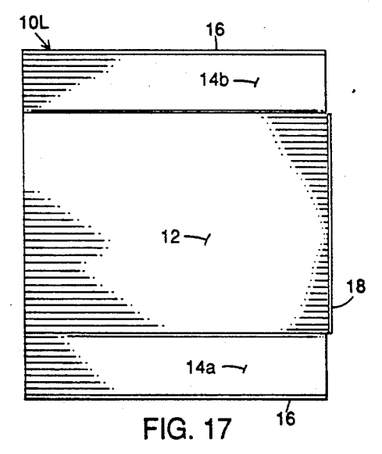
FIG. 17 is a top view of the trough assembly.

FIGS. 1 and 17 show a pair of identical troughs 10L and 10R with a flat rectangular floor 12, identical sloping front and rear walls 14a and 14b, and a vertical rectangular deflector 18.

Figure 18:
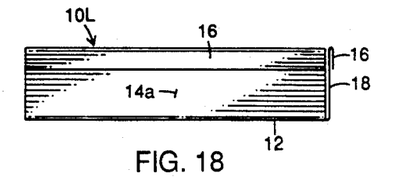
Figure 19:
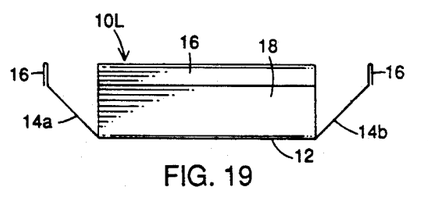
FIG. 19 is an inside end view thereof.

Referring to FIG. 19, the floor 12, with parallel front and rear edges, has integrally bent front and rear walls 14a–14b. The walls 14a–14b slope from the bottom, equally upward and outward, and terminate with outwardly folded hems 16, which are bent to a vertical standing position. The slope of the walls 14a–14b are of the same bevel angle as the front and rear walls of a conventional hibachi-type grill A. Referring to FIG. 18, the floor 12 of the troughs 10L and 10R have parallel side edges, and an integrally bent vertical deflector 18 with a hem 16 on the inner side edge, with the opposite side remaining open. The vertical height of the deflector 18 is equal to the top edge of the hem 16 of the walls 14a–14b. Referring to FIG. 1, the width of the side edge of the floor 12 is slightly shorter than the base width of the hibachi A.

Figure 2:
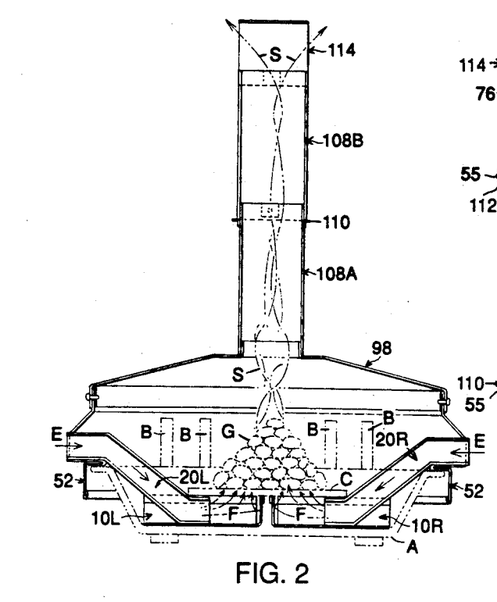
FIG. 2 is a sectional schematic view thereof.

Referring to FIG. 2, the pair of removable troughs 10L and 10R rests on the interior base of the hibachi. The opposing deflectors 18, near the center, and front-wall 14a block the draft doors of the hibachi. Referring to FIG. 19, the transverse distance between the hems 16 on the walls 14a-14b are slightly shorter than the grates C of the hibachi.

Referring to FIG. 1, a pair of altitude offset air supply ducts 20L and 20R has inlets 23 and outlets 25 with rectangular openings. Referring to FIGS. 1, 14, 15, 16, the ducts 20L-20R comprise a pair of identical cheeks 22a-22b in relation to the left and right, and a pair of transverse heels 38 and 46 from the bottom to the top, respectively.

Figure 11:
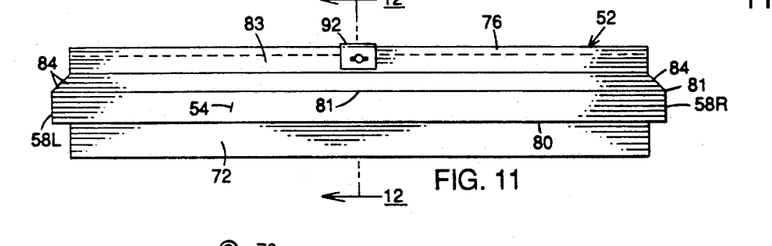
FIG. 11 is a front view thereof.
Figure 16:
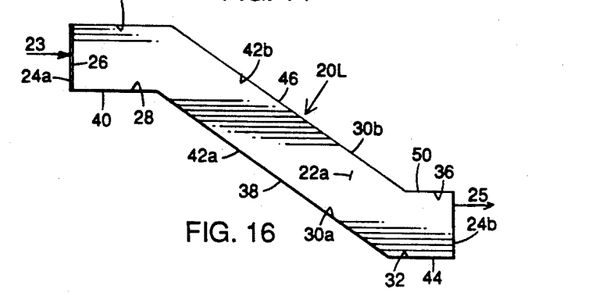
FIG. 16 is a front elevational view thereof.

The shape of the cheeks 22a-22b is of a cut boundary outline on a separate upper and lower inward horizontal plane, in the general shape of a shoe. An inlet vertical edge 24a with a flange stop 26 bends orthogonally outward. The edge 24a defines an inlet 23 having the width of the ducts 20L-20R. A lower inlet outline 28 connects with the lower point of edge 24a to form a perpendicular corner. The outline 28 is of a horizontal depth, which is measured inward, and starts at FIG. 12 at the frame support angle 80 and which slightly exceeds the clinch joint 78 of the sidewalls 58L-58R of the housing 52 in FIG. 11. Referring to FIG. 16, the outline 28 connects with a lower intermediate outline 30a at a common juncture. The outline 30a that denotes the altitude offset slants downward, and intersects and connects with a horizontal base outlet outline 32. The termination of the outline 32 connects at a lower point of the vertical edge of an outlet 24b, and which also forms a perpendicular corner the same as the vertical edge of the inlet 24a, and is of the same width.

The upper inlet outline 34 connects with the upper point of edge 24a, extends horizontally, and intersects and connects with the upper intermediate outline 30b.

The outline 30b has the same downward slant as its partner outline 30a, and connects with the grate rest outline 36. The outline 36 has a length shorter than the original length, which was used in the lower inlet outline 28 to connect and terminate at the upper point of the edge 24b.

The point of the intersection of outlines 30a and 32 and 34 and 30b are derived from a geometric construction method used in the standard industry of sheetmetal, known as "tangent to the arc."

Figure 15:
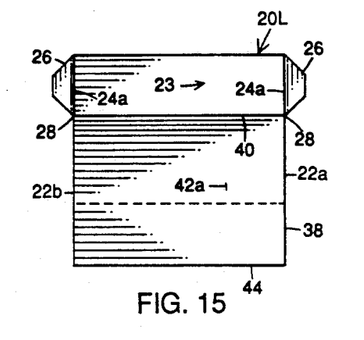
FIG. 15 is an inlet end view thereof.

Referring to FIGS. 1, 15 and 16, the bottom of the transverse heel 38 defines openings 23 and 25 and the lengths of the ducts 20L-20B. An inlet rest platform 40, with an inward distance between the parallel outer and inner edges, complements the outline 28 of the cheeks 22a and 22b. The inner edge of the platform 40 integrally bends to a bottom intermediate section 42a, with a distance and slant equal to the outline 30a of the cheeks 22a and 22b. The lower edge of section 42a integrally bends to a horizontal outlet base platform 44. The platform 44 has a distance equal to the outlet outline 32 of the cheeks 22a and 22b and terminates with the outer parallel edge.

Figure 14:
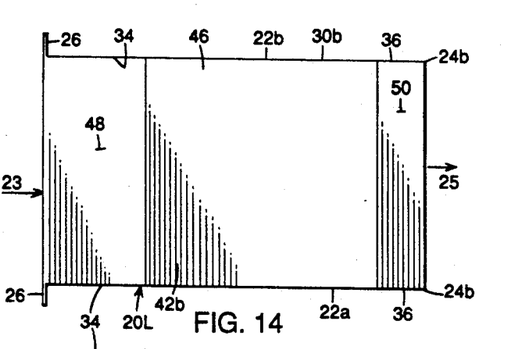
FIG. 14 is a top view of the air supply duct assembly.

Referring to FIGS. 1, 14, and 16, the top transverse heel 46 has parallel edges of equal width as the bottom heel 38. A top inlet platform 48 with an inward distance between the parallel outer and inner edges complements the upper inlet outline 34 of the cheeks 22a-22b. The inner edge of the platform 48 integrally bends with a top intermediate section 42b which slants downward, with a distance equal to the outline 30b of the cheeks 22a and 22b. The lower edge of the section 42b integrally bends with a grate support platform 50, and has a distance equal to the outline 36 of the cheeks 22a and 22b and terminates with the outer parallel edge.

Referring to FIGS. 1, 2 and 19, the cheeks 22a-22b and heels 38 and 46, in their designated configuration, are welded along abutting edges to form rectangular openings 23 and 25 of altitude offset ducts 20L-20R. The width and length of the outlet openings 25 are equal to the height of the walls 14a-14b, and slightly shorter than the outer side edge openings of the troughs 10L-10R of the floor 12, respectively.

Figure 8:
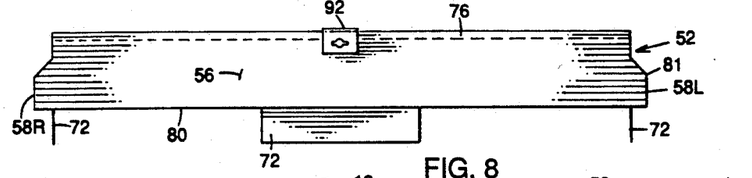
FIG. 8 is a rear elevational view of the housing assembly.
Figure 9:
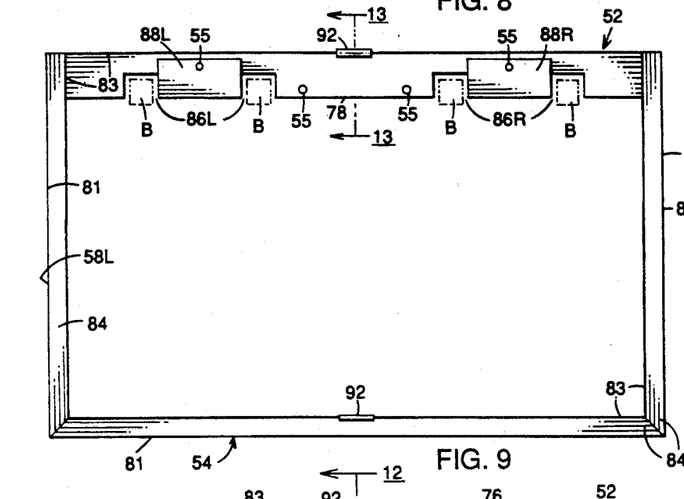
FIG. 9 is a top view thereof.
Figure 10:
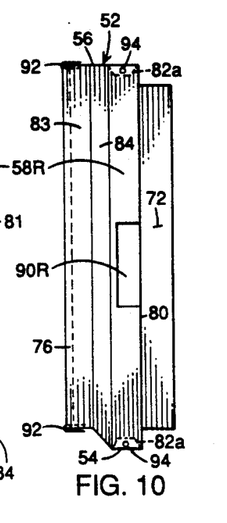
FIG. 10 is a right end view thereof (the left end view being a mirror image)

Referring to FIGS. 8-10, the rectangular housing assembly 52 is open at the top and the bottom. Removable walls comprise a front 54, rear 56, and identical sidewalls 58L-58R, in respect to left and right.

Referring to FIGS. 8-13, the bottom section of the frontwall 54 has a unitary strip of an L-shaped clamp bracket 60 that is inverted and pointed towards the center of the hibachi A. The bracket 60 comprises a horizontal support section 62 and a vertical attachment leg 64.

The leg 64 of the bracket 60 is attached by a rivet 55, to the inside surface of the depending leg 72 of a lateral stop 70, and positioned intermediate of the leg 72 length. The integrally bent section 62 of the bracket 60 extends inward near the exterior upwardly slanted frontwall of the hibachi A. The flat exterior underside top edge of the hibachi is plumbed to the section 62, at the top surface of the bracket 60. A 7.11 millimeters hole diameter is drilled or punched out. A blind nut insert 66 of open end type is placed through the hole, from the top surface of section 62 of the bracket 60, and is set with the manufacturer's own placing tool. A common thumbscrew 68 is rotated from and through the bottom open end of insert 66. Both the insert 66 and the thumbscrew 68 are of the same unified national pitch and thread.

The insert 66 and thumbscrew 68 are made of low carbon steel and are manufactured by Avdel of Parsippany, N.J. and VSI Fasteners of Los Angeles, Calif., respectively.

Referring to FIGS. 1, 9-13, the unitary lateral stop 70 is also of an inverted L-shape form and points toward the center of the hibachi A. The stop 70 comprises a depending leg 72 and a transverse section 74. The length of the stop 70 is equal to the linear top edge of the frontwall of the hibachi. The leg 72 extends downward vertically from above the top edge of the frontwall of the hibachi to an inward flattened hem 76 along the bottom. The downward height of the leg 72 determines the inner edge of section 62 of the bracket 60 open space from the upward slant of the frontwall of the hibachi. It also gives section 62 surface area for the installation of insert 66 as previously mentioned. The integrally bent section 74 of the stop 70 extends inwards above the frontwall top edge of the hibachi, and is attached by a rivet 55 between the fold of the clinch joint 78.

The joint 78 is of a length equal to the linear top edge of the frontwall of the hibachi. The joint 78 is positioned horizontally inside of the hibachi and has an open fold of a larger breadth than the standard hem used for rigid edges in sheetmetal industry.

The integral upper surface of the joint 78 extends horizontally outward beyond the top edge of the hibachi. The top edge of the hibachi is also a line of reference. The parallel joint 78 with miter corners connects to the parallel frame support angle 80.

The upper section of the frontwall 54 is integrally bent vertically from angle 80 to the upper parallel edge 81. Both sides, between angle 80 and edge 81, have a return 82a with a hem 76 bent orthogonally inward. The upper edge 81 has an offset 84 bent inward at 45 degrees with miters at corners. The offset 84 counterbends equally to a continuous vertical lip 83 with a hem 76 along the top edge.

Referring to FIGS. 8-13, the bottom section of the rear wall 56 has the same leg 64 of the bracket 60 attached by rivets 55 to the leg 72 of the stop 70. The section 62 of the bracket 60 extends the same to the exterior backwall of the hibachi A by a typical installation of the insert 66 and thumbscrew 68. The stop 70 is of an identical shape, but is of a shorter length than the frontwall 54. The section 74 of the stop 70 is attached by a rivet 55 between the fold of the joint 78, fits between the inner posts B of the grill holder of the two separated lateral tandem grill holders assembly of the hibachi. The same joint 78 that is positioned inside of the backwall of the hibachi has a recess 86L-86R cut out for each grill holder assembly. The recess 86L-86R position and length respectively are determined from a quarter division of the linear top edge of the backwall of the hibachi. The second and fourth divisions are the center reference point. The half length between the grill support post B and the outer side edge of either grill holder assembly is measured. The measured half length is transferred to each side of the center reference point. The cut rectangular recess 86L-86R has an outward depth which extends from joint 78, beyond the backwall top edge of the hibachi. The recess 86L-86R provides an open space for the lower back edge of the posts of the grill holder assembly.

Referring to FIG. 9, located laterally between posts B of each grill holder assembly is a flat rectangular cover plate 88L-88R. The plates 88L-88R are attached by a rivet 55, to the outward extending surface of the joint 78, reducing non-essential air from entering.

Figure 12:
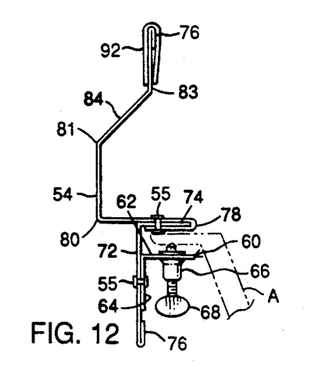
FIG. 12 is a sectional view taken through the line 12—12 of FIG. 11.
Figure 13:
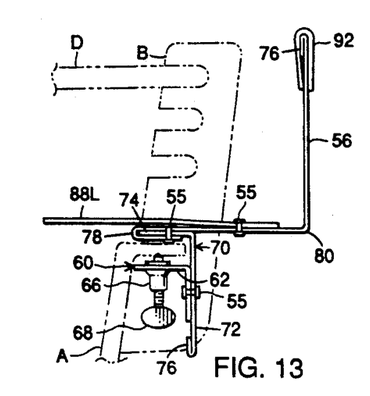
FIG. 13 is a sectional view taken through the line 13—13 of FIG. 9.

The same upper surface of the mitered joint 78 extends outside of each grill holder assembly outer post and between the inner posts of the two separated grill holders. Referring to FIGS. 12-13, the joint 78 extends further to angle 80, beyond the equally distanced front 54 and sidewalls 58L-58R of the housing 52. The extension surface provides for rearwall 56 open space from the outward slant of the grill holders assembly. The joint's 78 extended surface begins at the outer vertex of the miter to form a square corner with angle 80.

The upper section of the rear wall 56 bends vertically from angle 80 to a height equal to the grill holder assembly and to the companion walls 54, 58L, 58R of the housing 52. Both side edges of the rear wall 56 have a height equal to the edge 81 of the frontwall 54, and have the same return 82a with a hem 76. FIG. 8 The continuing rear wall 56 and the mentioned return 82a have a cut contoured at the upper corners to match the sidewalls 58L-58R and the offset 84, and terminate with a hem 76 along the top edge.

The sidewalls 58L-58R of the housing 52 have a vertical height equal to the companion walls 54 and 56 and are identical in respect from the left to the right. The bottom section of the sidewalls 58L-58R have the same mitered connecting joint 78 to the angle 80, as the frontwall 54, with the length equal to the linear top edge of the sidewall of the hibachi. Referring to FIG. 1 and 10, the sidewalls 58L-58R also include passageways 90L-90R, which are cut-out for air supply ducts 20L-20R. The rectangular passageway 90L-90R has a perpendicular cut-out outward depth which separates the joint 78 to angle 80 and up to the section of the vertical sidewall 58L-58R. The passageways' 90L-90R position and length respectively are determined by bisecting the sidewall of the hibachi's linear top edge for the center reference point. Half of the length of the ducts' 20L-20R inlet 23 or outlet 25 opening is transferred to each side of the center reference point. The joint 78 is separated by the cut-out of the passageways 90L-90R, and has the same section 74 of the stop 70 attached by the rivet 55 that joins the separated joint 78. The passageways' 90L-90R diagonal distance between the orthogonal section's 62 bending edge of the stop 70, to the cut-out length of the sidewalls 5BL-58R, is longer than the center points to the intersection of outlines 30a and 32 and 34 and 30b of the cheeks 22a-22b of the ducts 20L-20R.

The upper section of the sidewalls 58L-58R bends vertically from the parallel angle 80 to the edge 81. The vertical wall of the side 58L-58R includes surface at the rear equal to the joint 78 extension to the edge 80 of the rear wall 56. The upper edge 81 has the same bent offset 84 that counterbends to the vertical lip 83, terminating with a hem 76.

Figure 20:
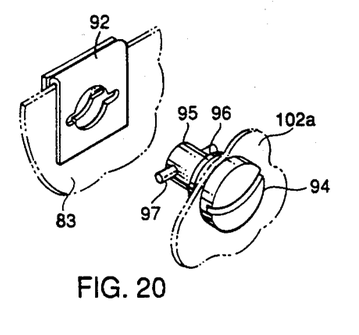
FIG. 20 is an enlarged perspective exploded view of the receptacle and ¼ turn stud attachments.

Referring to FIG. 20, the walls 54, 56, 58L, 58R of the housing 52 and other parts to be mentioned in this preferred embodiment are assembled or constructed with quarter turn fasteners. The interdependent fasteners consist of a receptacle 92 with a preferable clip-on type and an integral cross-pin stud 94. The quarter turn fasteners are made of steel and manufactured by Fairchild Fasteners Group of New Jersey. The typical installation procedure is described below.

Receptacles 92 which are installed on the return 82a or the lip 83 have a breadth which is standard in respect to the horizontal, vertical or non-parallel positions.

The frontwall 54 of the housing 52 has a return 82a along the sides, and the lip 83 on the top has a fold of the hem 76 notched out intermediate of height and length, respectively. The fold of the hem 76 is notched at 14.33 mm., equal to the width of the receptacle 92, by punching out a round hole, and cutting the remaining metal with sheetmetal snips. Another method employs a notching tool, which is used in the industry of sheetmetal. A distance of 8.38 mm. is measured perpendicular to the bent fold line of the hem 76. A common center axis through the hole of 8 mm. diameter is punched through the return 82a and the lip 83. The receptacle 92 is sandwiched onto the respective return 82a the lip 83, and is captivated inside the common center axis through the hole.

The vertical rear wall 56 of the housing 52 and the return 82a along the sides, at an equal distance from top as the lip 83, involves the same typical installation of receptacle 92 as the frontwall 54.

The sidewalls 58L-58R of the housing 52, with the side edges having an orthogonal and vertical measurement common to the hole at the center point, is punched with a 5.84 mm. diameter hole. A stem 95 with a cross-pin 97 of the stud 94 is inserted through the mentioned hole. A retaining ring 96 is placed around the stem 95, between the cross-pin 97 and the wall of the side SSL-58R, with pliers. The quarter turn fastener uses a common screwdriver to rotate the stud 94 into the receptacle 92.

Figures 5, 6, 7:
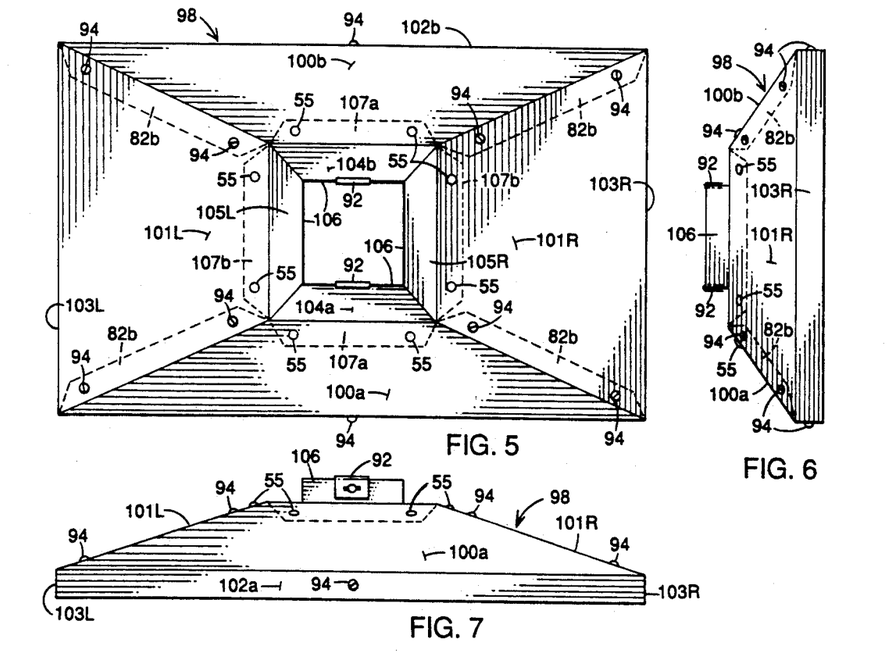
FIG. 5 is a top view of the cover assembly.
FIG. 6 is a right end view thereof (the left end view being a mirror image)
FIG. 7 is a front view thereof (the rear view being identical)

FIGS. 5-7 show a cover assembly 98 of a truncated pyramidal shape. The cover 98 comprises trapezoid-shaped panels 100a-100b and 101L-101R with a vertical skirt 102a-102b and 103L-103R along the bottom. A flat shoulder 104a-104b and 105L-105R on the top tapers inward, towards the centered square exhaust inlet with a vertical collar 106 and a hem 76.

The identically shaped front and rear panels 100a–100b each have their own integrally bent skirt 102a–102b with a hem 76 along the bottom. The height and length of the skirts 102a–102b are slightly taller and longer than the vertical lip 83 of the frontwall 54, and is equivalent to the top of the rear wall 56 of the housing 52. The stud 94 involves the typical installation, and is placed intermediate of the skirt 102a–102b length. The upper section of each panel 100a–100b integrally bends with its own skirt 102a–102b, to an inward and upward slant of 35 degrees. Each panel 100a–100b, along both sides of the non-parallel edges, has the same return 82b, bent inward to an angle in which the juxtaposed skirts 103L–103R form square corners. The non-parallel returns 82b of the panels 100a–100b have receptacles 92 which are typically installed near each of the ends. The flat shoulder 104a–104b of the panel 100a–100b has an underlap 107a bent to an equal degree of the slant, and is attached by a rivet 55 near the upper parallel edge. The sectional shoulder 104a–104b tapers inward towards the center vertical axis of the cover 98, to a partial formation of a square exhaust inlet, with a bent vertical collar 106. The collar 106 breadth is identical to the lip 83 or the return 82a–82b, and has a receptacle 92 of typical installation intermediate of length.

The identically shaped side panels 101L–101R have the same integral skirts 103L–103R along the bottom. The skirts 103L–103R are slightly taller and longer than the vertical lip 83 at the top of the sidewalls 58L–58R of the housing 52. The upper section of the panels 101L–101R bend with own skirts 103L–103R to an inward and upward slant of 20 degrees. The panels 101L–101R, along both sides of the non-parallel edges, have a hem 76, with the studs 94 typically installed to coincide with the receptacles 92 on the adjacent panels 100a–100b. The flat shoulder 105L–105R has the same slanted underlap 107b, and is also attached by a rivet 55 near the upper parallel edge. The sectional shoulder 105L–105R tapers inward, toward the center vertical axis of the cover 98, to complete the square exhaust inlet with the collar 106.

The vertical height of the cover 98 assembly, from the bending edge of the skirts 102a–102b and 103L–103R to the upper parallel edge, is equal to the height of the grill holder assembly of the hibachi and the walls of the upper section 54, 56, 58L and 58R, above angle 80 of the housing 52.

The exhaust inlet inside the dimension of the cover 98 is approximately 4.40 times larger than the outlet 25 opening of each duct 20L–20R.

Figures 3, 4:
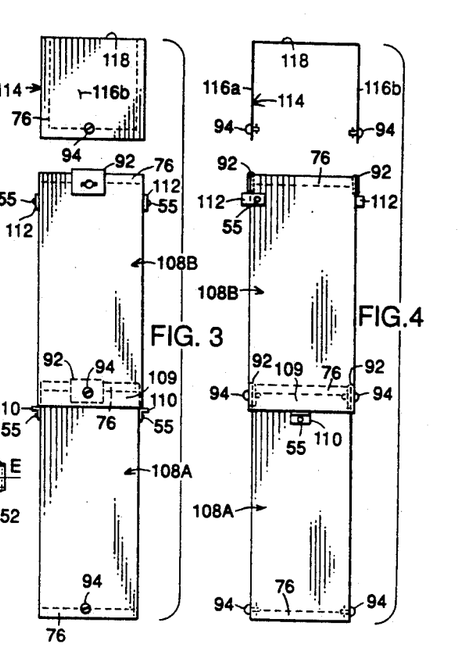
FIG. 3 is a front elevational view of the upper and lower stack and stack cap.
FIG. 4 is a side elevational view thereof.

Referring to FIGS. 3–4, square opening stacks 108A–108B, each of equal length, are joined in a vertical piggy-back configuration. Each stack 108A–108B is formed from two separate L-shaped lengths with the lap, and is riveted along the seam, using a tool common to the sheetmetal industry.

The lower stack 108A, with the hem 76 along the perimeter edge of both open ends, has an inside dimension slightly larger than the collar 106 of the cover assembly 98. The length of the stack 108A includes an overlap 109 that is of equal height to the skirts 102a–102b and 103L–103R on the panels 100a–100b and 101L–101R of the cover 98. Near the bottom opening of the stack 108A, the front and rear surfaces have studs 94 of typical installation, intermediate of width. Near the top opening on the same two surfaces, receptacles 92 of typical installation are in line with the studs 94. The top opening of the stack 108A also has a unitary strip of an inverted L-shaped overlap supporting the bracket, and is pointing outward. The bracket 110 that supports the overlap 109 is attached by a rivet 55 on the adjoining sides to the front and rear surfaces. The position of the bracket 110 is intermediate of width below the edge, and is equal to the included height of the overlap 109.

The upper stack 108B with the hem 76 along the perimeter edge of both open ends, has an inside dimension slightly larger than the lower stack 108A, and also includes the overlap 109. Near the bottom opening of the stack 108B, the front and rear surfaces have studs 94 of typical installation intermediate of width. Near the top opening on the same two surfaces, are receptacles 92 of typical installation, in line with the studs 94. The vertical seam, near the top opening, has a flat rectangular tab stop 112. The stops 112 that protrude outward are attached by rivets 55 on the opposite diagonal corner. The stop 112 prevents a stack cap 114 from lateral tilting.

The combined length of stacks 108A–108B in a vertical configuration is approximately 4 times taller than the equal height of the housing 52 and the cover 98 assembly in their operational constructed vertical configuration.

The stack cap 114 of inverted U-shaped form comprises of a vertical front 116a and rear 116b surface and a horizontal surface top 118. The cap 114 with the hem 76 along the rectangular perimeter and width, is slightly shorter tan the side of the upper square stack 108B. The front and rear surfaces 116a–116b include the same overlap 109. The surfaces 116a–116b bend orthogonally to the top 118, with studs 94 typically installed near the open ends, intermediate of width. Each side net exhaust opening dimension is equal to either opening of the upper stack 108B.

Referring to FIGS. 1–2, the employment of charcoal starter apparatus is accomplished by first positioning the front or back wall of the conventional hibachi into the wind. The walls 54, 56, 58L and 58R of the housing 52 are horizontally placed on the top perimeter edge of the hibachi. The joint 78 with the attached section 74 on the inside and leg 72 of the stop 70, borders the outside top perimeter edge of the hibachi. The walls 54, 56, 58L and 58R of the housing 52 are fastened using screwdrivers to rotate the studs 94 into receptacles 92 along the side edges of the sidewalls 58L–58R. The thumbscrews 68 on the bottom of the front and rear walls 54, 56 are clamped to the underside top edge of the hibachi. The troughs 10L–10R are placed on the interior base of the hibachi, with the opposing deflectors 18 near the center. The air supply ducts 20L–20R with the stops 26 are inserted through passageways 90L–90R until the stops 26 touch the sidewalls 58L–58R. The outlet 25 of the ducts 20L–20R rests on the floor 12 of the troughs 10L–10R. The grate C of the hibachi is placed on the top edges of the walls 14a–14b, and the deflectors 18 of the troughs 10L–10R and support the platform 50 of the ducts 20L–20R. Briquettes G are stacked in the form of a mound on the grates, and are saturated with charcoal lighter fluid.

The panels 100a–100b and 101L–101R of the cover 98 are pre-assembled by rotating the studs 94 into the receptacles 92 with a screwdriver along the non-parallel side edges. The assembly cover 98 is placed over the top of the housing assembly 52, and is fastened with the studs 94 on the skirts 102a–102b into the receptacles 92 on the lip 83 of the identical front and rear walls 54 and 56 of the housing 52. Briquettes, which are saturated with charcoal lighter fluid, are ignited with a common match dropped into the exhaust inlet collar 106 of the cover 98.

The stacks 108A-108B and the cap 114 are also pre-constructed with a vertical configuration. The bottom opening of the upper stack 108B is placed over the top opening of the lower stack 108B to rest on the bracket 110. The stacks 108A-108B, with the studs 94 and the receptacles 92, are fastened at their designated position on the front and rear surfaces. The cap 114 is placed over the top opening of the upper stack 108B, with the front and rear surfaces 116a-116b equal to the stack 108B between the tabs 112. The surfaces 116a-116b of the cap 114 are fastened with studs 94 into the receptacles 92. The attachment of the stacks 108A-108B and the cap 114 shall be known as the exhaust system thereafter.

The exhaust system 108A-108B and 114 is placed around the collar 106, to rest on the shoulders 104a-104b and 105L-105R of the cover 98, with conventional metal cooking tongs. The stack 108A with the studs 94 near the bottom opening of the front and rear surface is fastened into the receptacles 92 on the collar 106, at the same position on the panels 100a-100b of the cover 98.

Clearly, updraft is created which sucks the primary supply of air E outside of the hibachi under the grate, by way of the ducts 20L-20R. The constant flow of air is channeled between walls 14a-14b, and is diverted by the deflectors 18 of the troughs 10L-10R. The exit supply of air F which blows underneath the saturated burning briquettes accelerates the ignition process. The acute slanted panels 100a-100b and 101L-101R and the flat shoulders 104a-104b and 105L-105R of the cover 98 reflect and retard flames and heated air. The constrained heat aids to increase the internal temperature of the combined housing 52 and the cover 98 assembly. The flames which burns within the exhaust system 10SA-108B and 114 create back pressure by baffling of transverse top 118 of the cap 114. The top 118 which obstructs the velocity of the flames also contributes to escalate the internal temperature within the housing 52 and the cover 98. The front and rear surfaces 116a-116b of the cap 114 prevent the downdraft from oncoming wind from occurring.

The burning of charcoal lighter fluid with the briquettes continues for about 12 minutes, after which the flames diminish. The burning briquettes within the combined enclosure of the housing 52. cover 98, and exhaust system 108A-108B and 114 also have the draft effect of differential air pressure. The pressure effect assures the continued primary supply of air under the grates, by the conduit of the ducts 20L-20R. Containment of heat completes the burning process to the final ash-over results in about 2 minutes.

To prepare for cooking food stuff, the exhaust system 108A-108B and 114, with the cover 98 still attached, is unfastened with the studs 94 on the skirts 102a-102b from the receptacles 92 near the top of the front and rear walls 54 and 56 of the housing 52. Conventional cooking tongs are placed through the side opening, between the top 118 of the cap 114, and lifted off. The troughs 10L-10R, air ducts 20L-20R and housing 52 remain in their position. The housing 52 functions as a heat shield. The briquettes are spread out within the hibachi using tongs, and the cooking grill is placed on the top, resting on the grill holders, to cook food stuff.

When the user is finished cooking, and the briquettes are extinguished, the exhaust system 108A-108B and 114 is unfastened are unfastened and placed flatly within each other. The air ducts 20L-20R are pulled out through the passageways 90L-90R in the sidewalls 58L-58R of the housing 52. The walls 54, 56, 58L-58R of the housing 52 are unfastened, the thumbscrews 68 are unclamped, and the walls 54, 56, 58L-58R are placed within each other. The troughs 10L-10R are then removed from the interior base of the hibachi. All parts of the charcoal starter apparatus are stored in a common cardboard box.

Thus the reader will see the exhaust system 10SA-108B and 114 assures a positive updraft which provides a primary supply of air under the grate. The surface 116a-116b of the cap 114 prevents a disruption of the updraft, and the top 118 aids in intensifying the temperature. The enclosure of the housing 52 and the acute slant of the panels 100a-100b, 101L-101R of less than 60 degrees, constrains the flames and the heated air to maximize useful heat to burn briquettes. The convenience of quarter turn fasteners makes assembly and construction easy, eliminating the loss of nuts, bolts or screws are eliminated.

While my above description contains many specificities it should not be construed as a limitation on the scope of this invention, but rather as an example of one preferred embodiment.

For example, a trough can be a unitary U-shaped form. Opposing deflectors, each having a bend arc at the bottom, is attached by a rivet to the center of the floor of the trough. Air supply ducts, with the shape of 0-gee, include straight sections from the inlet to the outlet. A strip of a curved air extractor is then attached to the inlet rear cheek of the air duct. A rectangular housing with separate vertical walls is fastened with quarter turn fasteners. The bottom section of the walls has an inwardly bent surface edge. The inward edge on the rear wall has a recess for a grill holder. The inward edge of the sidewall, and a section of the vertical wall have a passageway cut out for ducts. Sufficient quantities of elongated holes are punched-out above the inward edge at several positions. A strip of thick gauge sheetmetal creates a J-stop. The stop is placed horizontally through the elongated hole and is riveted to the surface at the inward edge. The short curve of the J-stop is then threaded with a thumbscrew that clamps to the underside top edge of the hibachi. Inverted L-shaped support brackets are riveted near the top edge of the vertical walls at several positions. A unitary cover of rectangular shape changes to a round shape. The bottom section has vertical skirts which taper upward to a round inlet exhaust opening around the center vertical axis. The inlet exhaust has an attached cylindrical collar. The cover is placed over the top of the housing. The exhaust stack is of a cylindrical shape, and has a diameter slightly larger than the collar. An in-line hole is punched through, near the bottom opening of the exhaust stack and the collar on the cover. A straight steel round pin lance is placed through the in-line holes, joining the stack and the cover. A stack cap has an equal diameter, but has a different length. The shorter length is attached at the center to the longer horizontal pipe to form a T. The vertical pipe of the cap is placed over the top opening of the exhaust stack. In-line holes are punched out, and straight steel round pin lances are placed through the vertical pipe of the cap, and through the stack with the exhaust outlet on the sides.

What is claimed is:

1. A charcoal starter apparatus for use in a hibachi having an interior with a base having a left half and a right half, and a top perimeter, comprising:
   a pair of removable troughs, each configured to cover less than one of said halves of said base, each having a deflector edge, wherein said troughs are positioned in said interior so that said deflector edges are adjacent to and substantially parallel to each other;
   deflectors attached to said deflector edges and extending substantially vertically upwardly to a deflector height;
   conduit means for conveying air from outside said hibachi into a portion of said interior spaced apart from said deflectors;
   a rectangular housing configured to fit over said top perimeter;
   clamp means for removably clamping said housing to said hibachi over said top perimeter;
   a cover having an exhaust inlet configured to fit over said housing;
   a flue having a top and a bottom, with the bottom removably mounted over said inlet; and
   a cap removably fastened over said top of said flue.

2. A charcoal starter apparatus according to claim 1, wherein said conduit means comprises left and right ducts having inlet ends positioned above said top perimeter, intermediate sections extending downwardly into said interior, and outlet ends positioned spaced apart from said deflectors, wherein said outlet ends have an outlet height substantially equal to said deflector height, whereby a grill for said hibachi can rest on said outlet ends and said deflectors, whereby air drawn in through said inlet ends exits from said outlet ends underneath said grill.

3. A charcoal starter apparatus according to claim 1, wherein said cover and said flue comprise sheet metal.

4. A charcoal starter apparatus according to claim 1, wherein said cover comprises a truncated pyramid.

5. A charcoal starter apparatus according to claim 1, wherein said flue has a height that is approximately 4 times the combined heights of the housing and the cover.

6. A charcoal starter apparatus for use in combination with a conventional hibachi type grill having an interior with a base having a left half and a right half, front and rear portions sloping outwardly ad upwardly at a bevel angle, a top perimeter having a left part and a right part, and grill posts extending above said perimeter edge, comprising:
   a pair of removable troughs, each configured to fit in a half of said interior, wherein each of said troughs comprises:
   a flat floor configured to cover less than one of said halves of said base, having a front edge, a rear edge, and a deflector edge;
   a front side attached to said front edge sloping upwardly and outwardly at said bevel angle;
   a rear side attached to said rear edge sloping upwardly and outwardly at said bevel angle; and
   a deflector attached to said deflector edge and extending substantially vertically upwardly;
   said troughs being positioned so that said deflector edges of said troughs are adjacent to and substantially parallel to each other;
   a left removable air supply duct and a right removable air supply duct, each having an air inlet end, a downwardly slanting intermediate section and an air outlet end parallel to said air inlet end, wherein:
   said air inlet end of said left duct rests on said left part of said top perimeter;
   said air inlet end of said right duct rests on said right part of said top perimeter;
   each of said intermediate sections extends downwardly into said interior; and
   each of said air outlet ends rests on said bottom of one of said troughs adjacent to but spaced apart from one of said deflectors;
   a removable rectangular housing assembly configured to fit over said top perimeter comprising:
   a front wall, a left side wall having a left passageway, a right side wall having a right passageway and a rear wall having recesses for said grill posts, each of said walls being detachably attached to an adjacent wall to form said rectangular housing, and each of said walls having a bottom section and a top section;
   a front clamp bracket attached to said bottom section of said front wall for clamping said front wall to said to perimeter;
   a rear clamp bracket attached to said bottom section of said rear wall for clamping said rear wall to said top perimeter;
   wherein said air inlet ends of said ducts are positioned adjacent to said passageways;
   a removable truncated pyramidally shaped cover configured to fit around said to portions of said housing having a centered square exhaust inlet;
   a vertical collar around said exhaust inlet;
   a flue having a top and a bottom, with the bottom removably mounted over said collar; and
   an inverted U-shaped cap removably fastened over the top of said flue.

7. A charcoal starter apparatus according to claim 6, wherein said housing and said cover are removably fastened together with quarter turn fasteners.

8. A charcoal starter apparatus according to claim 6, wherein said troughs, said ducts, said housing, said cover and said flue comprise sheet metal.

* * * * *